May 23, 1967 S. L. MERKEL 3,321,698
VOLTAGE REGULATOR CIRCUITRY
Filed Dec. 9, 1963
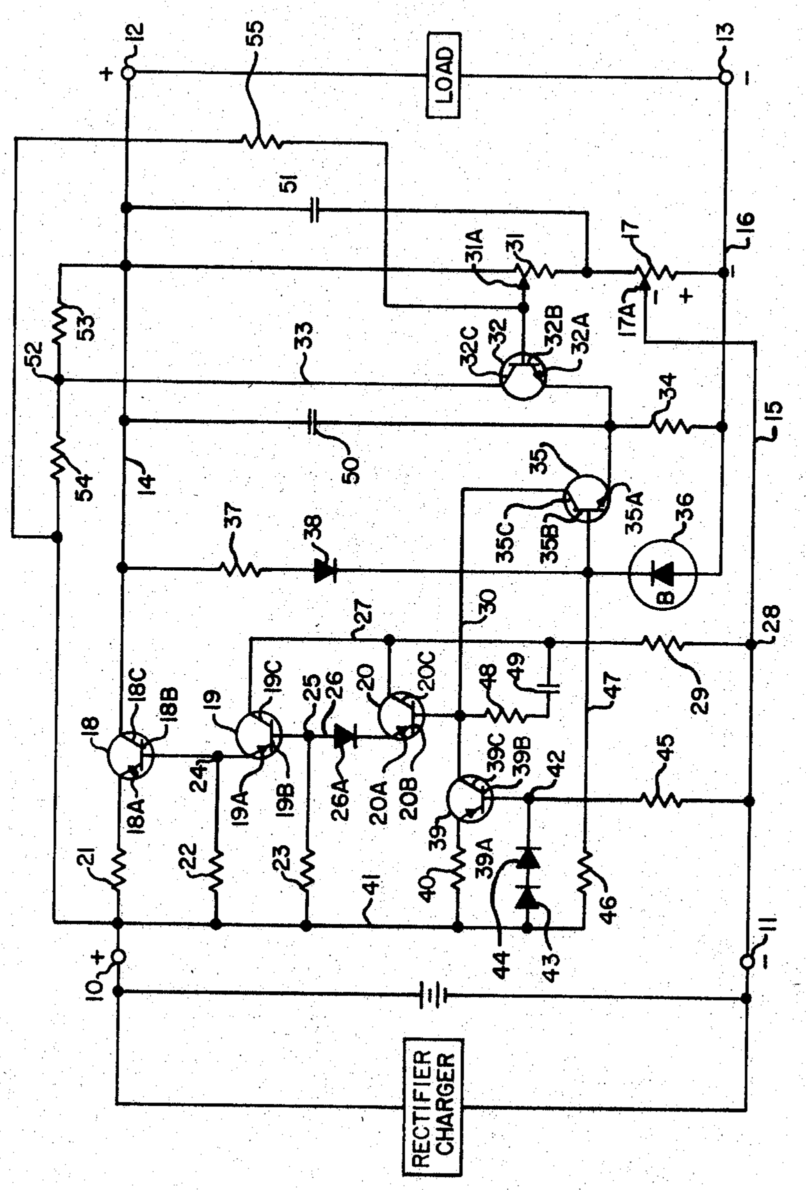
INVENTOR.
STEPHEN L. MERKEL
BY
ATTY.

United States Patent Office 3,321,698
Patented May 23, 1967

3,321,698
VOLTAGE REGULATOR CIRCUITRY

Stephen L. Merkel, Cleveland, Ohio, assignor to Lorain Products Corporation, a corporation of Ohio
Filed Dec. 9, 1963, Ser. No. 329,132
8 Claims. (Cl. 323—16)

This invention relates to voltage regulators and is directed more particularly to voltage regulator circuitry having a closely regulated output voltage.

The present invention is particularly adaptable to regulating circuits utilizing electronic components and is shown herein as applied to voltage regulating circuitry utilizing semiconductors such as transistors.

It is well known in the art that the current-voltage characteristic curves of electronic devices are non-linear in their overall form and that certain portions of the current-voltage curve approach linearity. In the use of these devices to obtain extremely close regulation, it has been found that the non-linear characteristic is detrimental to attaining precise regulation. Accordingly, if such regulating circuitry is to be used to attain precise regulation, some means must be provided whereby, in their voltage regulating activity, these electronic components are made to operate in the more linear region of the respective characteristic curves.

It is therefore an object of the present invention to provide improved voltage regulating circuitry to attain the above operation whereby the order or magnitude of regulation attained will be in small fractions of a percent as compared to the more coarse regulation ordinarily encountered in electronic devices, this being accomplished by a regulating high gain amplifier controlled by an error signal generating circuit the operation of which is maintained in the region described above.

It is an object of this invention to provide circuitry in which a predetermined increment of change in load current anywhere within the rated load capacity of the circuitry will result in less than a prescribed maximum amount of change in output voltage.

It is another object of the invention to provide circuitry in which a constant current is supplied to an error signal amplifier to stabilize the gain of the error signal amplifier and its associated circuits.

It is a further object of the invention to direct a constant current to the collector-emitter current path of one transistor of a pair of coacting transistors which comprise an error signal generator in a voltage regulator circuit whereby the gain of the transistor remains constant as its conduction is varied in response to changes of output voltage.

An additional object of the invention is to provide circuitry which will prevent variations of input voltage within a prescribed range from affecting the power dissipation and temperature of the error signal circuitry in an adverse manner whereby the output voltage is prevented from deviating from the value being maintained by the regulator circuitry.

Another object of the invention is to provide in regulator circuitry, an error signal amplifier in which, when the input voltage varies, the power dissipation and temperature in one transistor of an error signal amplifier is increased or decreased by the same amount as the power dissipation and temperature in a coacting transistor of the error signal amplifier to thus prevent changes in current through the first transistor as a result of its temperature variations.

It is another object of the invention to vary the power dissipation and temperature of one element of an error signal generator by the same magnitude as the power dissipation and temperature of a second cooperating element of the error signal generator whereby the voltage on the second element is prevented from changing due to its increased power dissipation and temperature when the input voltage to the regulator circuitry increases.

Still another object of the invention is to provide, in a voltage regulating circuit, a voltage divider network between an output terminal and an input terminal of like polarity and to energize one transistor of an error signal generating circuit from the voltage divider network whereby the transistor power dissipation changes by a predetermined magnitude with changes of input voltage.

Other objects and advantages of the invention will become apparent from the following description and accompanying drawings in which:

The single figure is a schematic diagram of circuitry embodying the invention.

Referring to the drawing, it will be seen that a device embodying the invention may be provided with input terminals 10 and 11 which are connected across a battery. A rectifier-charger, also connected across the battery terminals, supplies the load current for the regulating circuitry to maintain a charge on the battery while A–C line power is available. In order to deliver the output voltage and current of the regulator to a loud, a pair of output terminals 12 and 13 are provided, output terminal 12 being connected to input terminal 10 by means of a lead 14 while output terminal 13 is conneted to input terminal 11 through leads 15 and 16 and through a portion of potentiometer 17, the purpose of which will be explained presently.

For the purpose of maintaining the desired voltage at output terminals 12 and 13, the emitter-collector path of a PNP type transistor 18 having an emitter electrode **18*a*, a base electrode 18*b* and a collector electrode 18*c* is interposed between input terminal 10 and output terminal 12. It will be seen that by varying the emitter-collector conduction of transistor 18, and thus the voltage drop thereacross, in a desired manner, the voltage between output terminals 12 and 13 can be maintained constant in the presence of variations in voltage at the input terminals 10 and 11 or changes in the magnitude of the load at the output terminals 12 and 13. Transistor 18** may be considered as a controllable conducting means.

This varying conduction of transistor 18 is obtained from a PNP type transistor 19 which is, in turn, controlled by a PNP type transistor 20, transistors 19 and 20 being provided, respectively, with emitter electrodes **19*a* and 20*a*, base electrodes 19*b* and 20*b* and collector electrodes 19*c* and 20*c*. Transistors 18, 19 and 20** comprise a high gain amplifier.

To the end that the proper operating conditions for each of the transistors 18, 19 and 20 are established, the resistors 21, 22 and 23, all commonly connected at one end to the input terminal 10, are provided. The resistors 21, 22 and 23 are in the emitter-collector paths of transistors 18, 19 and 20, respectively, and provide bias for the respective transistors with which they are associated. As will be seen from the drawing, resistor 22 is tied to a junction 24 common to the base **18*b* of transistor 18 and the emitter 19*a* of transistor 19 while resistor 23 is connected to a junction 25 in the lead 26 which connects the base 19*b* of transistor 19 to the emitter 20*a* of transistor 20**.

From the foregoing it will be seen that the voltage developed across resistor 23, due to the conduction of transistor 20, is applied to the base **19*b* of transistor 19 and controls the conduction thereof. In a like manner, the voltage developed across resistor 22, as a result of the current through transistor 19, controls the conduction of transistor 19 which, in turn, controls the conduction of transistor 18 to maintain the output voltage of the device between terminals 12 and 13** at a constant value.

The emitter-collector paths of transistors 19 and 20 are completed by a lead 27 which connects the respective collector electrodes 19*c* and 20*c* to negative input potential as at junction 28 on lead 15. So that the desired potential is applied to the collectors 19*c* and 20*c*, a resistor 29 is inserted in lead 27 and serves to reduce the voltage applied to the collector electrodes of transistors 19 and 20 to a safe value.

To the end that the conduction of transistor 20 may be varied to, in turn, control the conduction of transistor 18, the base electrode 20*b* is connected to an error signal generating circuit through a lead 30. The amount of current drawn by the error signal generating circuit through the emitter-base circuit of transistor 20 thus determines the conduction of that transistor.

In order to detect any change, however slight, in the voltage between the output terminals 12 and 13, there is provided an NPN type transistor 32 having an emitter electrode 32*a*, a base electrode 32*b* and a collector electrode 32*c*. The emitter-collector current path for transistor 32 is established by connecting emitter 32*a* through a resistor 34 to lead 16 and by connecting collector electrode 32*c* through a lead 33 to a junction 52 on a voltage divider comprising resistors 53 and 54 and connected as shown between input terminal 10 and output terminal 12.

A potentiometer 31 and potentiometer 17 having wiper arms 31*a* and 17*a*, respectively, form a voltage divider between leads 14 and 16. Potentiometer 31 may be regarded as output voltage responsive means. By connecting the base 32*b* of transistor 32 to wiper arm 31*a* of potentiometer 31, it will be seen that an increase in voltage between the output terminals 12 and 13 will cause the base electrode of transistor 32 to become more positive with respect to the emitter electrode 32*a*. Hence, as 32 is an NPN transistor, it increases in conduction. A decrease in the output voltage will cause the base electrode of transistor 32 to become less positive with respect to the emitter electrode and the conduction of transistor 32 will therefore decrease.

To provide an output voltage responsive signal which will control the conduction of transistor 18 to thereby maintain the voltage regulator output voltage constant under normal load conditions, the output voltage must be compared to a reference voltage and the difference utilized to control the conduction of transistor 18. For this purpose an NPN type transistor 35 having its collector 35*c* connected to lead 30 and its emitter electrode connected to lead 16 through a resistor 34 is provided with a zener diode 36, connected between base electrode 35*b* and the lower end of resistor 34 and thus to lead 16. A fixed bias is maintained on transistor 35 by zener diode 36, current for which flows from positive potential on lead 14 through a current determining resistor 37, a blocking diode 38 and the zener diode to lead 16. The blocking diode prevents current flow from input terminal 10 through resistor 46, lead 47 and resistor 37 to output terminal 12 under starting conditions. Such current flow would greatly reduce the base-emitter current of transistor 35 so that it would not turn on to render other components operative as desired. As will be seen presently, transistors 32 and 35 coact to generate an error signal.

In a transistor operating at a relatively low value of collector-emitter current, the change in emitter-base voltage required to produce a particular change in collector-emitter current is much greater than that which will produce the same change when the collector-emitter current is substantially higher. Consequently, the gain of a transistor amplifier will vary as the collector-emitter current varies. This variation in gain is highly undesirable in the amplifying stages of a voltage regulator circuit and is particularly detrimental in an error signal generating circuit since the non-linearity produced will be amplified by the succeeding stages thereby causing humps and sags on the output voltage regulation characteristic.

To the end that the above described conditions will be avoided in this voltage regulator, a constant current is supplied to the collector 35*c* of transistor 35. This constant current is of a magnitude to place the operation of transistor 35 in a linear region so that the gain of transistor 35 is constant over the range of variation of its collector-emitter current. Thus the conduction of transistor 18, as controlled by transistor 35 through transistors 19 and 20, will change by a predetermined amount for a particular change in output voltage as detected by the coaction of transistors 32 and 35.

The constant current path for transistor 35 is established by connecting the lead 30 to the collector electrode 39*c* of a PNP type transistor 39 and by inserting a resistor 40 between the emitter electrode 39*a* of transistor 39 and lead 41 by means of which the resistor is connected to input terminal 10. Transistor 39 serves as a constant current generator, as will be explained presently. Thus, a current of constant magnitude flows from terminal 10 through lead 41, resistor 40, the emitter-collector path of transistor 39, the collector-emitter path of transistor 35, resistor 34, lead 16, a portion of potentiometer 17 and lead 15 to the terminal 11.

To the end that transistor 39 will supply this contsant current, the base 39*b* of transistor 39 is connected to a junction point 42 which is maintained at a constant potential with respect to terminal 10 and therefore, provides a fixed bias for that transistor. The fixed potential on junction point 42 is produced by the current flowing through diodes 43 and 44 and a resistor 45 all connected as shown between input terminals 10 and 11 by means of leads 41 and 15, respectively.

From the drawing it will be seen that the voltage between lead 41 and the collector electrode 39*c* of transistor 39 must be equal to the sum of the emitter-base voltages of transistors 18, 19 and 20 and the voltage across resistor 21, since these emitter-base paths and resistor 21 are in parallel with resistor 40 and the emitter-collector current path of transistor 39. Because the sum of the emitter-base voltages of transistors 18, 19 and 20 would normally be less than the desired emitter-collector voltage of transistor 39, a diode 26*a* is inserted in the path of the emitter-base currents of transistors 18, 19 and 20 to increase the voltage drop between input terminal 10 and the base electrode 20*b* of transistor 20, base electrode 20*b* being connected to collector 39*c* of transistor 39. This arrangement produces a suitable voltage across resistor 40 and the emitter-collector path of transistor 39 to aid in establishing the proper operating point for transistor 39.

From the foregoing description it will be seen that the conduction of transistor 18 is varied in the desired manner by means of transistors 19 and 20 which respond to any slight change of current impressed upon the constant current flowing through the collector-emitter path of transistor 35. This slight change impressed upon the constant current is due to variation in the conduction of transistor 35 and results from any change in voltage across resistor 34, which in turn, is due to the conduction of transistor 32 as determined by the voltage between output terminals 12 and 13. Accordingly, collector-emitter conduction of transistor 18 is responsive to potential reflected at wiper arm 31*a* of potentiometer 31 and base electrode 32*b* of transistor 32.

If, for example, the voltage at output terminals 12 and 13 increases slightly for any reason, the emitter-base voltage of transistor 32 will increase thereby producing increased conduction of transistor 32 and greater voltage drop across resistor 34. This increased voltage of resistor 34 is reflected as a positive going potential on the emitter electrode 35*a* of transistor 35 with respect to the base electrode 35*b* thereof, since base electrode 35*b* is maintained by zener diode 36 at fixed potential with respect to lead 16 and the negative output terminal 13. This action reduces the conduction of transistor 35 and accordingly the current therethrough. However, because the current from transistor 39 is constant, any change in transistor 35 current results in a change of the same magnitude in the emitter-base current of transistor 20, thus causing transistor 20 to operate at a relatively high gain.

As a result of the decreased current flowing through lead 30 due to the reduced conduction of transistor 35 when voltage at output terminals 12 and 13 rises slightly, the emitter-base current of transistor 20 is reduced, consequently reducing the conduction of transistor 20. As will be seen from the drawing, the arrangement of transistors 18, 19 and 20 is such that a decrease in the conduction of transistor 20 will result in a decrease in conduction of transistors 19 and 18. Thus, with the above circuitry, any slight increase in voltage at the output terminals causes a decrease in conduction of transistor 18 and a resulting increased voltage drop thereacross to maintain the voltage between terminals 12 and 13 at a constant value.

If for any reason the voltage between terminals 12 and 13 decreases slightly, the conduction of transistor 18 will be increased to lower its voltage drop. This action makes more voltage available at output terminals 12 and 13 to correct for the decrease in output voltage.

In any power supply circuitry it is well known that as output load increases, the output voltage will decrease slightly due to the higher current through transistor 18 which, in turn, requires more drive current to the amplifiers of the regulating circuitry provided. This characteristic is known as droop of the regulation curve.

To the end that droop will be substantially eliminated, circuitry embodying the invention utilizes in the present instance a potentiometer 17 having a wiper arm **17*a* connected to the input terminal 11 by means of the lead 15. The upper end of potentiometer 17 is connected to resistor 31, as shown, while the lower end is connected to output terminal 13 by means of the lead 16** as shown.

With no current being drawn from output terminals 12 and 13, the voltage between wiper arm **17*a* and the lower end of potentiometer 17 is some portion of the voltage appearing at otuput terminals 12 and 13 as determined by the value of resistance between the wiper arm 17*a* and the lower end of the potentiometer. This value of resistance is adjustable by means of wiper arm 17*a*. However, when a load is connected between terminals 12 and 13, current flows from input terminal 10, through the load from terminal 12 to 13, through part of potentiometer 17 to input terminal 11. The potential developed between wiper arm 17*a* and lead 16 due to the load current is of the polarity shown in the FIGURE and its magnitude is proportional to the load current. This potential will increase as load current increases and will result in a negative going condition on the base 32*b* of transistor 32 with respect to its emitter 32*a*. The effect of this rising negative potential on base 32*b* is to reduce the conduction of transistor 32 thereby causing greater conduction of transistor 18 to maintain the voltage at output terminals 12 and 13** at a constant value with load current increase. This action prevents droop of the output voltage as load current rises.

Thus it will be seen that as output load current increases at terminals 12 and 13, the voltage drop across transistor 18 will decrease to compensate for the reduction of output voltage or droop that would normally occur as aresult of increased load current. The amount of compensation required may be selected by adjustment of wiper arm **17*a***. This adjustment determines the slope of the output voltage regulation curve.

When the input terminals 10 and 11 of the device are first connected across the battery, no voltage appears at output terminals 12 and 13 since transistor 18 is not initially conducting. Due to this lack of voltage between terminals 12 and 13, transistors 32 and 35 cannot become operative and as a result transistors 18, 19 and 20 will not turn on. To the end that transistor 35 will turn on, a resistor 46 is connected from the positive input lead 41 to the base electrode **35*b* of transistor 35 by a lead 47. The resistor 46 and the lead 47 provide a current path from input terminal 10 through the base-emitter path of transistor 35, resistor 34, part of potentiometer 17 and lead 15 to input terminal 11. Thus, the current flowing through the path provided by resistor 46 and lead 47, forward biases transistor 35 causing it to conduct and to thereby render transistors 18, 19 and 20 conducting. When transistor 18 begins to conduct, voltage will appear between the output terminals 12 and 13 and, as this voltage increases, transistor 32 and zener diode 36** will become energized.

It will be seen that resistors 46 and 37 with the load form a current path which is parallel to the emitter-base current path of transistor 35. If current were allowed to flow from input terminal 10 to input terminal 11 through resistors 46 and 37 and the load, it would prevent transistor 35 from turning on when power is applied to the input terminals 10 and 11 since current for forward biasing transistor 35 would be shunted around it. As explained previously, a blocking diode 38 is inserted between resistor 37 and the base **35*b* of transistor 35** to block any such current flow.

Though a high degree of regulation is provided by the circuitry thus far described, if the input voltage increases, there may be a minute and gradual increase in output voltage over a period of time. This increase is due to increased power dissipation and the resulting higher temperature in transistor 35 after any input voltage increase, the effect being a reduction in emitter-base voltage of transistor 35.

It will be seen that due to the constant voltage zener 36, the voltage across resistor 34 must increase when the emitter-base voltage of transistor 35 decreases. This increased voltage on resistor 34 reduces the conduction of transistor 32, the magnitude of current by which the conduction has been reduced now adding to the collector-emitter current of transistor 35. This increased current of transistor 35 increases the conduction of transistors 18, 19 and 20 thereby causing the output voltage to rise.

To the end that compensation will be provided to counteract the higher output voltage caused by the temperature rise of transistor 35 when input voltage increases, a voltage divider comprising resistors 53 and 54 is connected between input terminal 10 and output terminal 12. The collector electrode **32*c* of transistor 32 is connected to the junction 52 between resistors 53 and 54**. These resistors serve as an input responsive voltage means.

If the input voltage increases, the voltage across resistor 53, and consequently the collector-base voltage of transistor 32 will increase thereby increasing the power dissipation and temperature of transistor 32. Due to this increased temperature, the emitter-base voltage of transistor 32 decreases, thus causing the voltage on resistor 34 to increase. This increased voltage on resistor 34 reduces the conduction of transistor 35 by an amount sufficient to cancel the increase of current which, as described previously, would otherwise be produced in transistor 35 after a rise in input voltage.

It will be apparent that the emitter-base voltage of transistor 32 must be increased or decreased by the same amount as such changes in transistor 35 in order to have the desired temperature compensation. However, the collector-emitter current of transistor 32 is much greater than that of transistor 35, and therefore, transistor 32 does not require as great a change in collector voltage as transistor 35 to produce the same increase in power dissipation when input voltage increases.

To the end that the change in collector voltage of transistor 32 will be of the desired magnitude, resistors 53 and 54 are so proportioned that the power dissipation and temperature of transistor 32 change by the same amount as the power dissipation and temperature of transistor 35 when input voltage at terminals 10 and 11 varies. Thus, by varying the power dissipation of transistor 32 as a function of input voltage and in the same amount as that of transistor 35, the changes in emitter-base voltages of transistors 32 and 35 are equalized. This prevents any change in output voltage due to the change in power dissipation of transistor 35 when input voltage changes.

As explained previously, the conduction of transistor 32 is controlled by the voltages on potentiometers 17 and 31 to thereby control the conduction of transistor 18 so that the voltage between output terminals 12 and 13 is maintained at a relatively constant value. To the end that the amount of change in the output voltage due to variation of the input voltage will be further reduced, a resistor 55 is connected from the input terminal 10 to the base electrode **32*b* of transistor 32. This resistor insures that variations of input voltage will affect the conduction of transistor 32 and, consequently, of transistor 18** in such a manner as to oppose any inclination of the output voltage to vary with the input voltage.

If desired, a lag network comprising a resistor 48 and a capacitor 49 may be connected between base **20*b* and collector 20*c* of transistor 20. This network insures that low frequency signal components to be amplified by transistors 18, 19 and 20** will have the proper phase shift.

Any error signal developed due to a slight change in voltage at the output terminals and after having passed through the several stages of amplification of the voltage regulator has a lagging phase angle which tends to produce oscillations in the voltage regulator circuitry. In order to cancel this lagging phase, a capacitor 50 may be connected between lead 14 and resistor 34 and provides a leading phase angle for high frequency component signals, thus preventing oscillations which might otherwise occur.

Additional filtering and transient suppression for the voltage regulator may be provided by a capacitor 51 connected from the upper end of potentiometer 17 to lead 14 as shown.

The NPN and PNP type transistors used in this circuit may be replaced by PNP and NPN types, respectively, if the polarity of the input voltage is reversed.

It will be understood that the embodiments shown herein are for explanatory purposes and may be changed or modified without departing from the spirit and scope of the invention as set forth in the claims appended hereto.

What I claim is:

1. In a voltage regulating circuit having positive and negative input and output terminals adapted to be connected between respective positive and negative terminals of a D.-C. source and a load, the combination of controllable conducting means connected between an input terminal and an output terminal of like polarity, error signal generating means, means for connecting said error signal generating means in conduction controlling relationship to said controllable conducting means, a transistor having an emitter, a collector and a base electrode, and arranged to supply current to said error signal generating means, unidirectional conducting means and first resistive means connected serially between said input terminals, second resistive means, means for connecting said second resistive means between said emitter electrode of said transistor and one of said input terminals, means for connecting said base electrode of said transistor to a junction point between said unidirectional conducting means and said first resistive means whereby said transistor is provided with afixed bias, means for connecting said collector electrode of said transistor to said error signal generating means to prevent variation in the gain of said error signal generating means.

2. In a voltage regulating circuit having input and output terminals adapted to be connected between a D.-C. source and a load, the combination of a controllable conducting means connected between an input terminal and an output terminal of like polarity, output voltage responsive means, error signal generating means including first and second transistors, means for connecting the collector electrode of said first transistor to one of said output terminals, means for connecting the base electrode of said first transistor to said output voltage responsive means, resistive means commonly connecting the emitter electrode of said first transistor and the emitter electrode of said second transistor to the other of said output terminals whereby said transistors coact in operation, constant voltage means connected between the base electrode of said second transistor and said other output terminal, constant current means, means for connecting the collector electrode of said second transistor to said constant current means whereby the gain of said second transistor is stabilized, means for connecting said collector electrode of said second transistor to said controllable conducting means to control the conduction thereof.

3. In a voltage regulating circuit having input and output terminals, in combination, variable conducting means serially connected between in input terminal and output terminal of like polarity, and having a control electrode, a first voltage divider connected across said output terminals, constant voltage means, resistive means, error signal generating means comprising first and second transistors each having a base, a collector and emitter electrode, means for connecting said resistive means between one of said output terminals and a point electrically common to said emitter electrodes of said first and second transistors, means for connecting said control electrode of said first transistor to said first voltage divider, means for connecting said constant voltage means between said control electrode of said second transistor and one of said output terminals, means for connecting the collector electrode of said second transistor to the control electrode of said variable conducting means, a second voltage divider connected between an input terminal and an output terminal of like polarity, means for connecting said collector electrode of said first transistor to said second voltage divider whereby the power dissipation in said first transistor changes by the same magnitude as that of said second transistor when voltage between said input terminals varies.

4. In a voltage regulating circuit having input and output terminals, in combination, variable conducting means serially connected between an input terminal and an output terminal of like polarity and having a control electrode, a first voltage divider connected across said output terminals, constant voltage means, first resistive means, error signal generating means including first and second transistors each having a base, a collector and an emitter electrode, means for connecting said first resistive means between one of said output terminals and a point electrically common to said emitter electrodes of said first and second transistors, means for connecting said base electrode of said first transistor to said first voltage divider, means for connecting said constant voltage means between said base electrode of said second transistor and one of said output terminals, amplifying means, means for connecting the collector electrode of said second transistor to the control electrode of said variable conducting means through said amplifying means, a constant current source, means for connecting said constant current source to said collector electrode of said second transistor to stabilize the gain thereof, a second voltage divider connected between an input terminal and an output terminal of like polarity, means for connecting said collector electrode of said first transistor to said second voltage divider whereby changes in power dissipation of said first and second transistors due to changes in input voltage are equalized, second resistive means connected between one of said input terminals and said base of said second transistor, unidirectional conducting means and third resistive means serially connected between said base electrode of said second transistor and one of said output terminals whereby current can flow from said one of said output terminals toward said constant voltage means but current cannot flow from said one of said input terminals to said one of said output terminals through said third resistive means.

5. In a regulating circuit adapted to be connected between a D.-C. source and a load and having input and output terminals, in combination, controllable conducting means connected between one input terminal and one output terminal of like polarity, amplifying means adapted to control the conduction of said controllable conducting means, error signal generating means including first and second semiconductor means each having at least a base, an emitter and a collector electrode, resistive means connected between one of said output terminals and the emitter electrodes of said first and second semiconductor means, output voltage responsive means, means for connecting said base electrode of said first semiconductor means to said output voltage responsive means, a voltage divider connected between said one input terminal and said one output terminal of like polarity, means for connecting said collector electrode of said first semiconductor means to said voltage divider, means for connecting said collector electrode of said second semiconductor means to said amplifying means, a first resistor connected between said one of said input terminals and said base electrode of said second semiconductor means, a constant voltage device connected between the other of said output terminals and said base electrode of said second semiconductor means, a second resistor and unidirectional conducting means connected between said base electrode of said second semiconductor means and said one of said output terminals whereby current from said first resistor is prevented from shunting the base-emitter path of said second semiconductor means when said constant voltage device is non-conducting during starting conditions and whereby current is supplied to said constant voltage device under normal operating conditions, a constant current source comprising a third semiconductor means having at least a base electrode, an emitter electrode and a collector electrode, a third resistor connected between said emitter electrode of said third semiconductor means and said one of said input terminals, fixed bias means connected between said base electrode of said third semiconductor and said one of said input terminals, means for connecting said collector electrode of said third semiconductor means to said collector electrode of said second semiconductor means whereby a constant current is directed through the collector-emitter path of said second semiconductor to stabilize the gain thereof.

6. In a voltage regulating circuit having input and output terminals, in combination, variable conducting means serially connected between an input terminal and an output terminal of like polarity and having a control electrode, a first voltage divider connected across said output terminals, constant voltage means, first resistive means, error signal generating means including first and second transistors each having a base, a collector and an emitter electrode, means for connecting said first resistive means between one of said output terminals and a point electrically common to said emitter electrodes of said first and second transistors, means for connecting said base electrode of said first transistor to said first voltage divider, means for connecting said constant voltage means between said base electrode of said second transistor and one of said output terminals, amplifying means, means for connecting the collector electrode of said second transistor to the control electrode of said variable conducting means through said amplifying means, a constant current source, means for connecting said constant current source to said collector electrode of said second transistor to stabilize the gain thereof, a second voltage divider connected between an input terminal and an output terminal of like polarity, means for connecting said collector electrode of said first transistor to said second voltage divider whereby changes in power dissipation of said first and second transistors due to changes in input voltage are equalized, second resistive means connected between one of said input terminals and said base of said second transistor, unidirectional conducting means and third resistive means serially connected between said base electrode of said second transistor and one of said output terminals whereby current can flow from said one of said output terminals toward said constant voltage means but current cannot flow from said one of said input terminals to said one of said output terminals through said third resistive means, means for connecting the other of said input terminals to a point on said first voltage divider whereby load current is directed through a portion of said first voltage divider to vary the conduction of said first transistor and consequently the conduction of said variable conducting means in a manner to oppose any tending of output voltage to change with varying load current.

7. In a voltage regulating circuit adapted to be connected between a D.-C. source and a load, the combination of first variable conducting means connected between the D.-C. source and the load, amplifying means arranged to control the conduction of said first variable conducting means, an error signal generating means, including second and third variable conducting means, resistive means having one end connected to one side of the load, means for connecting said second variable conducting means between the other end of said resistive means and the other side of said load, output voltage responsive means adapted to control the conduction of said second variable conducting means, means for connecting said third variable conducting means between said amplifying means and said other end of said resistive means whereby changes of voltage across said resistor control the conduction of said third variable conducting means and of said first variable conducting means through said amplifying means, a constant current source, means for directing current from said constant current source through said third variable conducting means whereby the gain of said third variable conducting means is stabilized during normal variations of load current and input voltage.

8. In a voltage regulating circuit having input and output terminals adapted to be connected between a D.-C. source and a load, the combination of a controllable conducting means connected between an input terminal and an output terminal of like polarity, output voltage responsive means, error signal generating means including first and second transistors, input responsive voltage means connected between one of said input terminals and one of said output terminals, means for connecting the collector electrode of said first transistor to said input voltage responsive means whereby the power dissipation of said first transistor varies with changes in input voltage, means for connecting the base electrode of said first transistor to said output voltage responsive means, resistive means commonly connecting the emitter electrode of said first transistor and the emitter electrode of said second transistor to the other of said output terminals whereby said transistors coact in operation, constant voltage means connected between the base electrode of said second transistor and said other output terminal, constant current means, means for connecting the collector electrode of said second transistor to said constant current means whereby the gain of said second transistor is stabilized, means for connecting said collector electrode of said second transistor to said controllable conducting means to control the conduction thereof.

References Cited by the Examiner

UNITED STATES PATENTS

| | | | |
|---|---|---|---|
| 2,889,512 | 6/1959 | Ford et al. | 323—22 |
| 2,981,884 | 4/1961 | Tighe | 323—22 |
| 3,069,617 | 12/1962 | Mohler | 323—22 |
| 3,072,841 | 1/1963 | Saunders | 323—22 |
| 3,103,617 | 9/1963 | Schneider et al. | 323—22 |
| 3,214,678 | 10/1965 | Higginbotham | 323—22 |

JOHN F. COUCH, *Primary Examiner.*

W. E. RAY, G. GOLDBERG, *Assistant Examiners.*